(12) United States Patent
Alicherry et al.

(10) Patent No.: US 7,561,534 B2
(45) Date of Patent: Jul. 14, 2009

(54) METHODS OF NETWORK ROUTING HAVING IMPROVED RESISTANCE TO FAULTS AFFECTING GROUPS OF LINKS SUBJECT TO COMMON RISKS

(75) Inventors: Mansoor Ali Khan Alicherry, Scotch Plains, NJ (US); Iraj Saniee, New Providence, NJ (US); Sudipta Sengupta, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 866 days.

(21) Appl. No.: 10/880,887

(22) Filed: Jun. 30, 2004

(65) Prior Publication Data
US 2006/0002291 A1    Jan. 5, 2006

(51) Int. Cl.
*H04L 12/28* (2006.01)
(52) U.S. Cl. .................. 370/255; 370/228; 370/248; 370/351; 716/12; 717/104
(58) Field of Classification Search ............. 370/216, 370/228, 248, 255, 351; 716/12; 717/104
See application file for complete search history.

(56) References Cited

U.S. PATENT DOCUMENTS

| | | | | |
|---|---|---|---|---|
| 5,210,837 | A * | 5/1993 | Wiecek | 717/104 |
| 6,678,876 | B2 * | 1/2004 | Stevens et al. | 716/12 |
| 2005/0031339 | A1 * | 2/2005 | Qiao et al. | 398/4 |
| 2005/0073958 | A1 * | 4/2005 | Atlas et al. | 370/238 |
| 2005/0237950 | A1 * | 10/2005 | Yuan et al. | 370/255 |

OTHER PUBLICATIONS

Suurbale, J.W., "Disjoint Paths in a Network", ORSA-TIMS-AIEE, 1972 Joint National Meeting Atlantic City, Nov. 1972, Networks, pp. 125-145.

* cited by examiner

*Primary Examiner*—William Trost, IV
*Assistant Examiner*—Toan D Nguyen

(57) ABSTRACT

A number of techniques are described for routing methods that improve resistance to faults affecting groups of links subject to common risks. One of these techniques accounts for failure potentials in physical networks by considering shared risk link groups separately from performance and costs metrics in determining a primary routing path and a backup path. A shared risk link group (SRLG) is an attribute attached to a link to identify edges that have physical links in common and can therefore be simultaneously disrupted due to a single fault. Another technique considers node disjointness and provides a solution of two paths that are as node disjoint as possible and minimizes administrative costs. The techniques may further be combined in a priority order thereby providing a solution of at least two paths that are strictly SRLG disjoint, as node-disjoint as possible, and have minimum administrative costs. Due to the priority order of evaluation and typical network physical configurations of links, with the links associated common fault SRLGs, the priority ordering technique is very efficient in determining at least two paths for routing between a source and destination node.

20 Claims, 7 Drawing Sheets

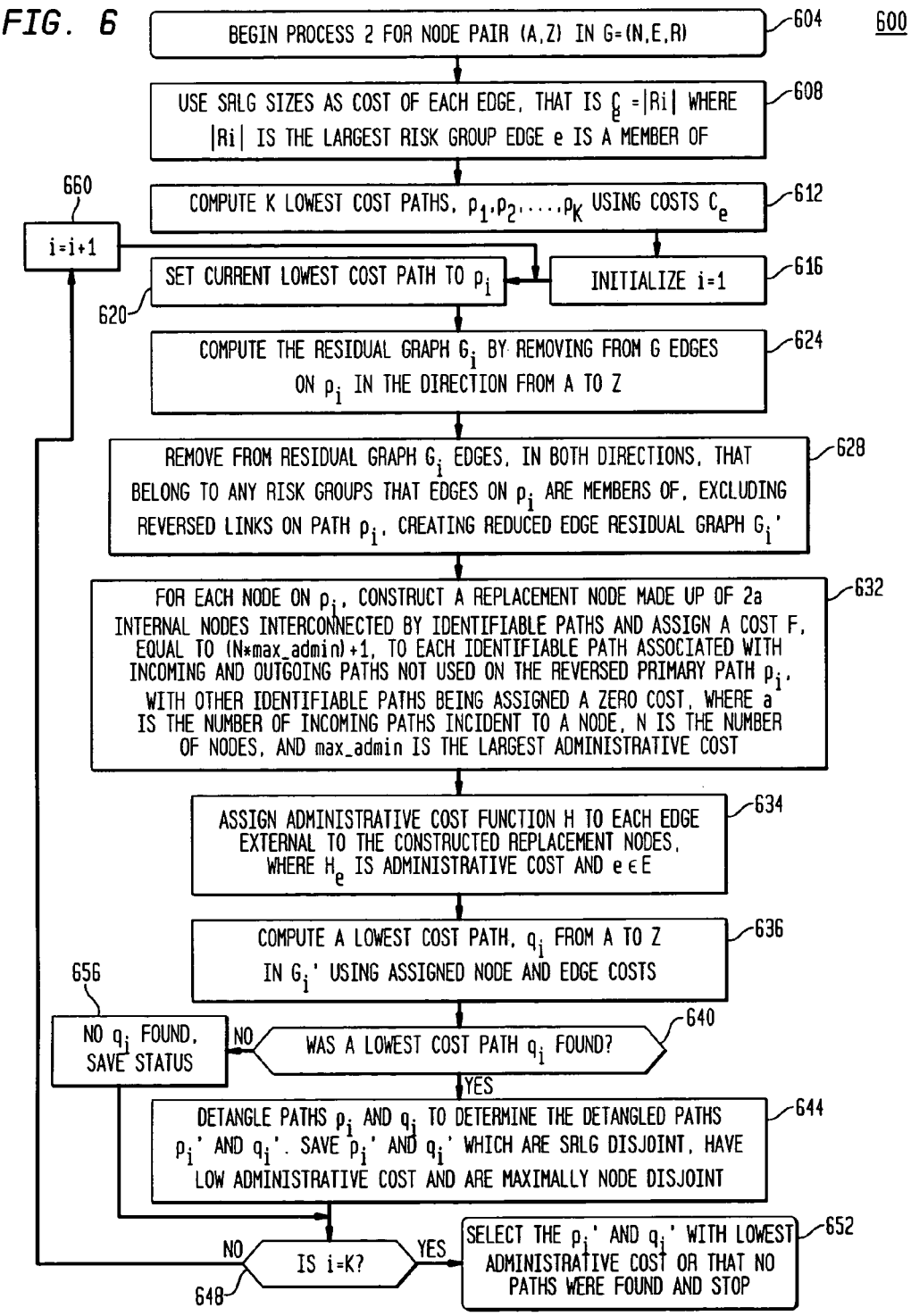

METHODS OF NETWORK ROUTING HAVING IMPROVED RESISTANCE TO FAULTS AFFECTING GROUPS OF LINKS SUBJECT TO COMMON RISKS

FIELD OF INVENTION

The present invention relates generally to routing methods for determining paths in interconnection networks for communication or computer use.

BACKGROUND OF INVENTION

Communication networks take many forms for interconnecting a source node to a destination node. With the advent of the Internet and its exponential growth, communication networks are increasing in size and complexity and moving toward using optical networks to provide very high speed interconnection bandwidth of the order of gigabits to terabits per second. An optical network generally consists of optical switch nodes and fiber optic interconnection links between nodes arranged in a general mesh topology. Due to the size and complexity of many communication networks, routing paths between numerous source and destination nodes that meet various constraints is a difficult problem. Some of the constraints considered, for example, are performance, in terms of path distance and bandwidth, costs, such as fiber and equipment costs, and link and node failure probabilities.

A physical network is typically modeled by converting point to point links to edges in a directed or undirected graph with nodes in the graph corresponding to optical switches and source and destination points of the physical system. The nodes and edges may be labeled with a metric, typically performance and costs, as a constraining parameter on the link or node. The problem of finding routing paths in a physical network corresponds to finding paths in the directed or undirected graph. Failure probabilities have been typically accounted for by routing two paths, a primary path and a backup path, and making both paths as disjoint as possible.

One approach to finding a node/edge disjoint pair of paths between a given node pair in a directed or undirected graph is to use a technique such as described by Suurballe, "Disjoint paths in a Network," Networks, Vol. 4, pp. 125-145, 1974. Since many characteristics of physical networks are not easily abstracted to a graph, using techniques such as described by Suurballe are not adequate, especially when considering failure potentials in physical networks.

SUMMARY OF INVENTION

Among its many aspects, one embodiment of the present invention addresses a method of determining a first primary routing path and a first backup routing path in a physical network. A graph G is defined to represent the physical network with nodes of G representing connection nodes of the physical network and edges of G representing links of the physical network. Shared risk of link failure costs are assigned to a plurality of edges of graph G. A first primary routing path from a first node of the network to a second node of the network is then identified based on graph G with assigned shared risk of failure costs. A first backup routing path form the first node of the network to a second node of the network is then identified based on a reduced edge residual graph from which, at least one edge that shares a risk of failure with an edge of the first primary routing path, has been removed.

Also, among its several aspects, another embodiment of the present invention addresses a method for constructing replacement nodes in a network graph. The network graph G being defined to represent a physical network with nodes of G representing connection nodes of the physical network and edges of G representing links of the physical network. A network path from a starting node to an ending node is identified and nodes on the network path are selected to be replacement nodes. For each replacement node, $2b$ internal nodes are constructed, where the value b being the number of incoming paths incident to the associated node in a reduced edge residual graph from which, at least one edge that shares a risk of failure with an edge of the network path, has been removed. The $2b$ internal nodes in each constructed node are then interconnected by identifiable paths that represent valid network paths of the reduced edge residual graph where, the valid paths connect through the replacement node.

A more complete understanding of the present invention, as well as other features and advantages of the invention, will be apparent from the following detailed description and the accompanying drawings.

BRIEF DESCRIPTION OF DRAWINGS

FIG. 6 illustrates a presently preferred third program flow chart of an SRLG disjoint path routing process that determines strict SRLG disjoint paths that are as node disjoint as possible, have minimum path length, and have minimal administrative costs in accordance with the present invention;

DETAILED DESCRIPTION

Figure 1:
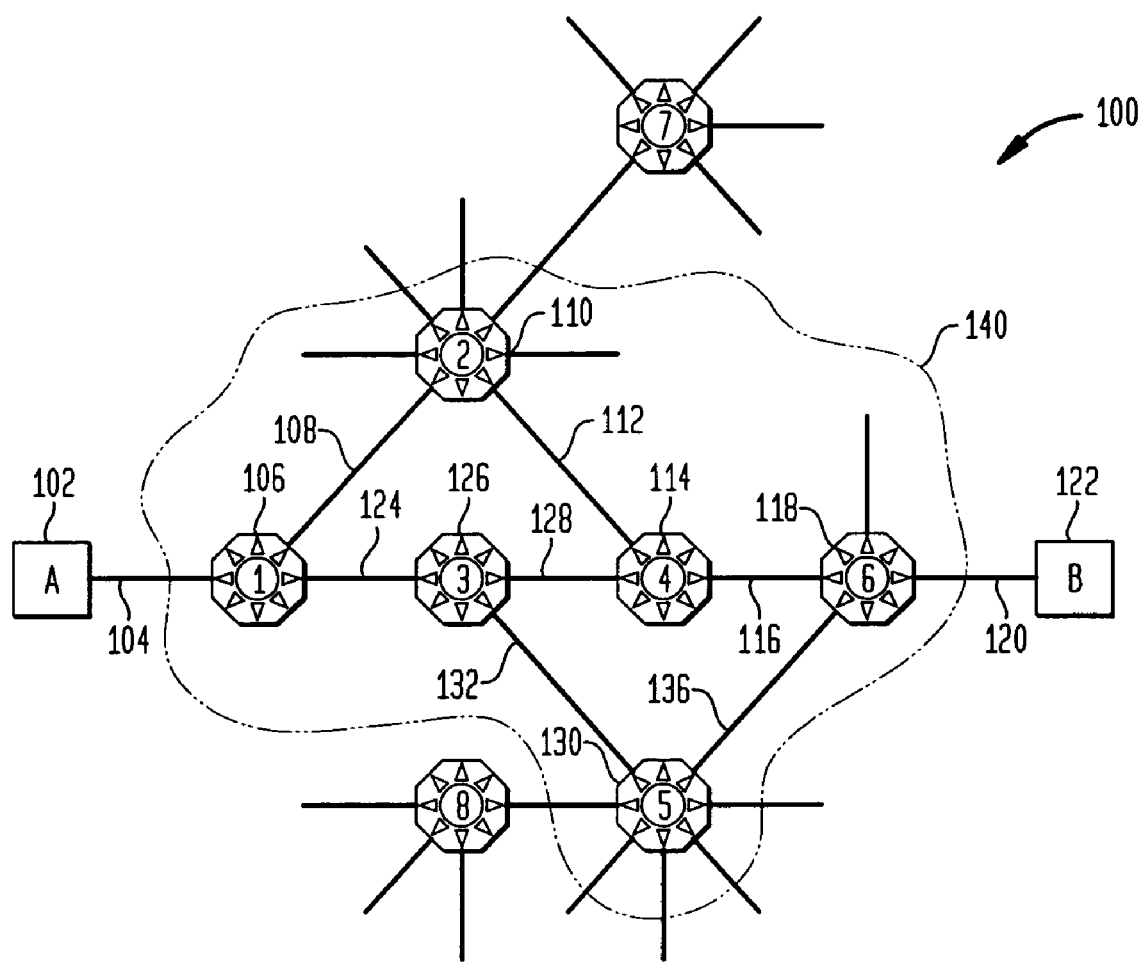
FIG. 1 illustrates an exemplary optical mesh network.

FIG. 1 shows a physical network of connection nodes connected by links. In FIG. 1, the physical network is embodied as an optical network made up of optical switch nodes connected by optic fiber links in a general mesh topology.

Links 104 and link 120 are considered to be standard interface connections, which may be optical connections, to access node devices A 102 and B 122, respectively. The links, such as 108, 112, 116, 124, 128, 132, and 136, are considered to use optical fibers that may carry multiple optical channels. The nodes 106, 110, 114, 118, 126, and 130 are optical switch nodes that can switch an incoming light path to an outgoing light path. Since optical switches are designed to be redundant, the typical type of failure that occurs in optical networks is damage to the fiber optic lines.

A particular example of a routing problem is the problem of finding a disjoint pair of paths in FIG. 1 between node 1 106 and node 6 118. The physical network, represented by the outlined area 140, is modeled on an undirected graph 200 of FIG. 2A, by converting point to point fiber links to edges in an undirected graph with nodes in the graph corresponding to the optical switches of the physical system. Specifically, links 108, 112, 116, 124, 128, 132, and 136 of FIG. 1 correspond to edges 208, 212, 216, 224, 228, 232, and 236 of FIG. 2A, respectively. Since each link and corresponding edge represent bidirectional communication paths, graph 200 is considered an undirected graph. Nodes 106, 110, 114, 118, 126, and 130 of FIG. 1 correspond to nodes 206, 210, 214, 218, 226, and 230 of FIG. 2A, respectively.

A well known technique to find a node/edge disjoint pair of paths between a given node pair in a directed or undirected graph is described by J. W. Suurballe, "Disjoint paths in a network", *Networks*, vol. 4, pp. 125-145, 1974. The technique requires solving a shortest path problem twice: once from a source node to a destination node using a directed or undirected graph, and the second time on a residual graph, again from the source node to the destination node. The residual graph is a subgraph of the original graph that remains after directed edges on the first shortest path, in the direction of the source to destination, have been sequentially removed. In an undirected graph, each edge can be thought of as having two edges that are directed but in opposite directions. The solution for the shortest path of the residual graph, if it exists, may require a post-processing step to remove edges that may be traversed in opposite directions in the pair of shortest paths selected.

Figure 2A:
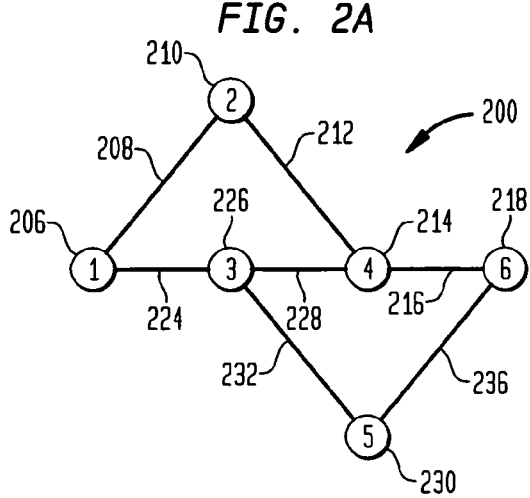
FIG. 2A illustrates an undirected sub graph of the optical mesh network of FIG. 1, to be used in discussing steps of a prior art technique, illustrating the connection links and nodes between a node 1 and a node 6.

FIGS. 2A-2F show a typical evolution of applying a prior art technique to undirected graph 200 of FIG. 2A to find a pair of disjoint paths between node 1 206 and node 6 218. First, a shortest path is found in graph 240 outlined by box 244 of FIG. 2B. Second, directed edges on the shortest path are removed, which leaves the reverse path from node 6 to node 1 as outlined in box 254 of FIG. 2C, to create the residual graph 250. Third, the shortest path on the residual graph 250 is found as indicated by dotted line 264 of graph 260 of FIG. 2D. Fourth, the two discovered shortest paths are merged in graph 270 of FIG. 2E thereby creating two redundant edges between node 3 and node 4 as highlighted by common edges 274. Fifth, a post-processing step is performed to remove shared redundant edges, the common edges 274 of FIG. 2E, leaving graph 280 with two disjoint paths as indicated by dotted lines 284 and 288. Such merging of paths and elimination of edges is called detangling.

Figure 2B:
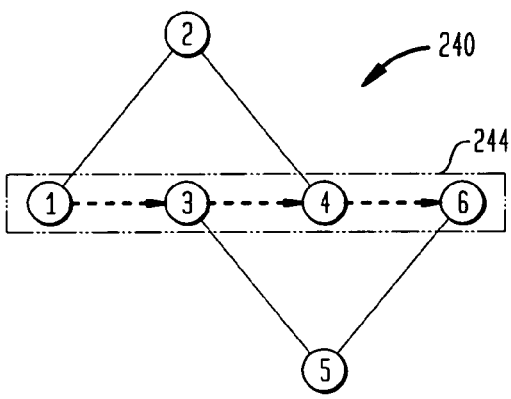
FIG. 2B illustrates a shortest path between node 1 and node 6 to be used to discuss steps of a prior art technique.
Figure 2C:
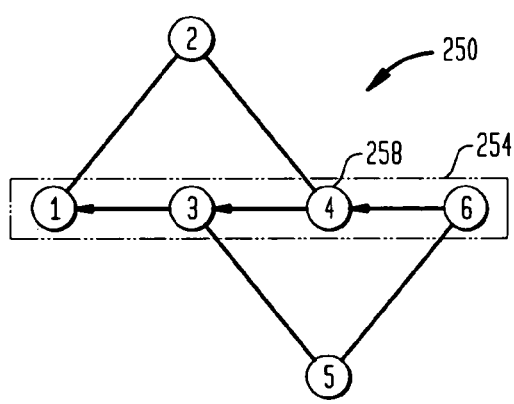
FIG. 2C illustrates a residual graph determined using the shortest path found in FIG. 2B to be used to discuss steps of a prior art technique.
Figure 2D:
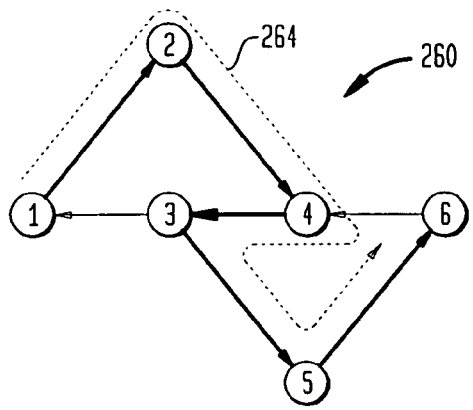
FIG. 2D illustrates a shortest path found on the residual graph of FIG. 2C to be used to discuss steps of a prior art technique.
Figure 2E:
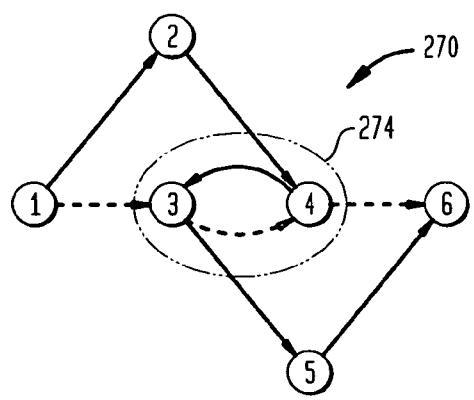
FIG. 2E illustrates one aspect of a detangling step with a merger of the two shortest paths found in FIG. 2B and FIG. 2D and highlights an example of redundant edges to be used to discuss steps of a prior art technique.
Figure 2F:
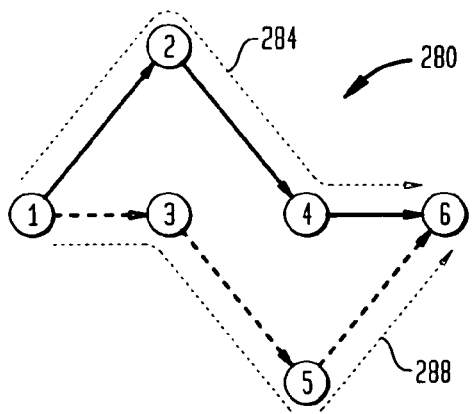
FIG. 2F illustrates another aspect of a detangling step where two disjoint paths are obtained after the removal of the redundant edges of FIG. 2E to be used to discuss steps of a prior art technique.
Figure 3A:
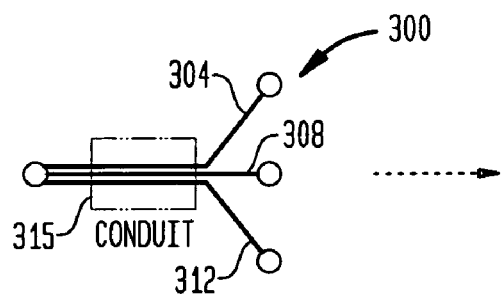
FIG. 3A illustrates one typical scenario encountered in a portion of a physical network where communication links are physically routed together to pass through a conduit causing a shared common risk of failure.

Though the technique described above with reference to FIGS. 2A-2F is efficient, the idea of diversity as applied to a graph, that is, in the sense of node or edge disjointness, may not be adequate for diversity in a physical network. In a communication network, edges may share physical attributes not directly observable when the network is abstracted by a graph. Shared risk link groups (SRLGs) are a mechanism to identify groups of edges that have physical segments in common and which can therefore be simultaneously disrupted due to a single fault. Shared risk of link failures may arise most commonly in two scenarios as shown in FIGS. 3A and B and FIGS. 4A and B.

Figure 3B:
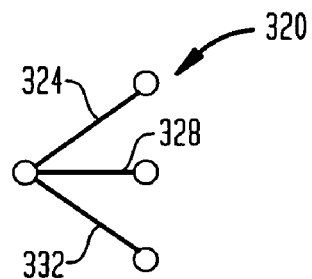
FIG. 3B illustrates a graph abstraction of the portion of the physical network of FIG. 3A where physical aspects of routing through a conduit are not depicted.

To track shared risks, each edge in a network graph is assigned one or more attributes, typically in an integer form, that represent various shared risks due to physical attributes of the network. For example, FIG. 3A illustrates a network sub-section 300 of a larger physical network with links 304, 308, and 312 that, due to physical placement, are all routed through a conduit 315. For example, such physical routing may occur when multiple communication links requiring connection to a central server are physically placed in the same conduit in a wall of a building. In FIG. 3B, a network graph abstraction 320 of the network sub-section of FIG. 3A is shown, with corresponding edges 324, 328 and 332, which only abstracts connected links and nodes and consequently does not illustrate the confinement of the physical fibers in conduit 315. In network sub-section 320 of FIG. 3B, all three edges, 324, 328 and 332, belong to one SRLG since the three physical fiber links 304, 308, and 312, corresponding to the three edges, 324, 328, and 332, respectively, are all routed through a conduit 315 and consequently a single fault can affect all three links.

Figure 4A:
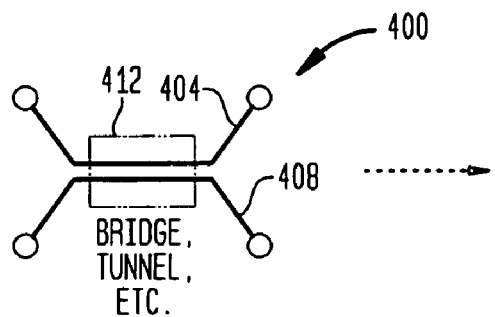
FIG. 4A illustrates a typical scenario encountered in a portion of a physical network where communication links are physically routed together to pass through a bridge or a tunnel causing a shared common risk of failure.
Figure 4B:
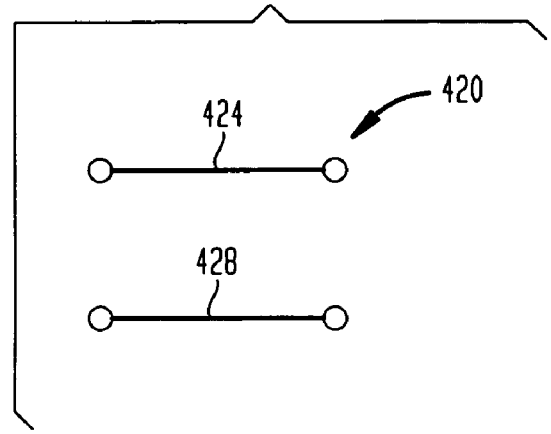
FIG. 4B illustrates a graph abstraction of the portion of the physical network of FIG. 4A where physical aspects of routing through a bridge or a tunnel is not depicted.

In another example, FIG. 4A illustrates another network sub-section 400 of a larger physical network with links 404 and 408 that are physically placed through a tunnel, a bridge or the like, 412. In FIG. 4B a network graph abstraction 420 of the network subsection of FIG. 4A is shown, with corresponding edges 424 and 428, which only abstracts connected links and nodes and consequently does not illustrate the physical fiber placement. In FIG. 4B, the parallel edges 424 and 428 belong to the same SRLG since a single fault can affect both links. In both FIGS. 3B and 4B, edges in a shared risk link group are distinct and may even be disjoint as shown in FIG. 4B. Thus the graph abstraction of a communication network can fail to represent shared risks.

To formalize SRLGs, a network graph can be described by a three tuple (N, E, R) representing a physical network where N is a set of nodes, E is a set of edges in the network, and R is a set of elements, each of which consists of edges that share a common risk. Formally, $R_i \in R$ for $1 \leq i \leq S$, where each $R_i$ is a set of edges in E and S depends on the network size. Thus, two edges $e_1$ and $e_2$ share a common risk if and only if $e_1 \in R_i$ AND $e_2 \in R_i$ for some $R_i \in R$. We note that an edge may belong to multiple SRLGs.

Disjoint paths in a communication network can now be defined not only with respect to nodes and edges, but also, more accurately, relative to R. Thus, to improve a network's resistance to faults, a pair of paths is searched for between a node pair that are node/edge disjoint and have no risk groups in common. Unfortunately, this problem, in its full generality, is a hard problem, considered non-deterministic polynomial-time hard (NP-hard), primarily on account of shared risks of a type corresponding to those illustrated by way of example in FIG. 4A.

Since a general physical network consists of many types of fault situations, including both of the types represented in FIGS. 3A and 4A, it is difficult to establish an efficient, general and exact process for resolving an SRLG-disjoint path problem to cover a wide range of physical routing risks. Consequently, a number of specific heuristics are used and presented herein.

Among its many aspects, the present invention may be advantageously utilized to account for failure potential in physical networks, node disjointness of routing paths, minimum path length, and minimum administrative costs in efficiently finding primary and backup routing paths. Failure potentials in physical networks are accounted for by considering paths having common shared risks of failure and using a shared risk link group metric which is advantageously considered separately from performance and costs metrics in determining primary and backup paths. A shared risk link group (SRLG) is an attribute attached to a link to identify edges that have physical elements in common and can therefore be simultaneously disrupted due to a single fault. Node disjointness may be accounted for by an advantageous method of assigning node costs to minimize node overlaps in primary and backup paths. Path length and administrative costs may be minimized by advantageously assigning path length and node costs in determining a backup path after a primary path is found. Further, the present invention may advantageously evaluate these aspects of path failure potential, node disjointness, minimum path length, and administrative costs in a priority order thereby providing a solution of at least two paths that are strictly SRLG disjoint, as node-disjoint as possible, and have minimum administrative costs including minimum total path length. Due to the priority order of evaluation and typical network physical configurations of links, where the links are associated with common fault SRLGs, the priority ordering and cost metric assigning techniques are very efficient in determining at least two paths for routing between a source and destination node. To such ends, exemplary processes are described in detail below for SRLG disjoint routing.

In a first process 500, the SRLGs are represented by $R_1, R_2, \ldots, R_S$ and a new variable $|R_i|$ is introduced to denote the size of a shared risk link group. As an example, $|R_i|$ may represent the number of edges that are in $R_i$, being a sum of the members of $R_i$. Process 500 illustrated in FIG. 5 uses size of SRLGs for the computation of the first path.

Process 500 begins with defining a network graph G equal to (N, E, R) representing a physical network to find a primary routing path and a backup routing path between node pair (A, Z), initial step 504. In a presently preferred embodiment, the primary routing path and the backup routing path are to be disjoint with respect to shared risk of link failures. The process continues by using SRLG sizes as a cost of each edge, that is $C_e=|R_i|$ where $|R_i|$ is the largest risk group edge e is a member of, where e ∈ E, step 508. It is realized that a plurality of edges may be assigned SRLG costs due to practical considerations with zero or estimated SRLG costs assigned as appropriate. Next, K lowest cost paths $p_1, p_2, \ldots, p_K$ are computed using costs $C_e$, step 512. Note that open shortest path first (OSPF) is a standard process that can be used to determine the lowest cost paths. This process determines a path based on a metric, such as assigned costs, and thus computes lowest cost paths even though it is called open shortest path first. Then, i is initialized to 1 in step 516 and the current lowest cost path is set to $p_i$, step 520. Continuing with step 524, the residual graph $G_i$ of G is computed by removing from G, edges in $p_i$ in the direction from A to Z. In the next step 528, edges, in both directions, are removed from the residual graph $G_i$ to eliminate edges that belong to any risk groups that edges in $p_i$ are members of, excluding reversed links on path $p_i$, thereby creating a reduced edge residual graph $G_i'$. An administrative cost function H including path length is assigned in the next step 530 for each edge e, where e ∈ E. It is noted, that process 500 can use arbitrary administrative costs, where an administrative cost is any non-negative assignment of costs to edges of a graph. In process 500, arbitrary administrative costs can be included through the cost function H in step 530. The lowest cost path process that was run previously in step 512 is now run on the reduced edge residual graph $G_i'$ to find a lowest cost path $q_i$ from A to Z using cost function H, step 532. If a lowest cost path $q_i$ was found, step 536, then the process continues by detangling paths $p_i$ and $q_i$ and saves $p_i$ and $q_i$ or their detangled variants as the detangled paths $p_i'$ and $q_i'$, save step 540. Process 500 then proceeds to step 544. If a lowest cost path $q_i$ was not found for this graph $G_i$, the process proceeds to step 544. In step 544 it is determined if all paths for i≦K have been evaluated. If i is less than K, the process proceeds to increment i by one, step 548, and then proceeds back to step 520 to repeat the process steps 520 to 536 to continue to try to find a disjoint pair of paths. If i is equal to K, then the process proceeds to end step 556. The $p_i'$ and $q_i'$ with lowest administrative costs are selected from the saved results file or it is noted that no paths were found.

Although process 500 addresses the requirement of SRLG disjointness and minimal length using the cost function H in step 530 as an administrative cost, it pays no attention to node disjointness. It may be desirable to have strict SRLG disjoint paths, which are also node disjoint and have small administrative costs. Unfortunately, it may not be possible to create node disjoint paths between a source node and a destination node. This may be due to a network, for example, that is designed to have single hub nodes serving end nodes. An example of such a network is network 100 of FIG. 1 which has two such single hub nodes, node 1 106 and node 6 118. Two disjoint routing paths between node 1 106 and node 6 118 can be determined as previously described above. However, in order to find paths between node A 102 and node B 122, a path 104 from node A 102 to node 1 106 must be followed and to reach node B 122 a path 120 from node 6 118 must be followed. Consequently, two routing paths between node A 102 and node B, 122, cannot be completely node disjoint due to the network construction and node 1 106 and node 6 118 must be common nodes on the two otherwise disjoint paths between node A 102 and node B 122.

Thus, for a reasonable solution, it is important to have a strict SRLG-disjoint pair of paths that are as node-disjoint as possible and have minimal length and administrative costs. If these three conditions are interpreted in a priority order, a meaningful problem solution emerges. Without this priority, comparisons arise that may be hard to resolve. For example, consider a comparison between a pair of SRLG-disjoint paths with one node in common and total administrative cost of 100 and a pair of SRLG-disjoint paths with two nodes in common and total administrative cost of 60. With the priority ordering of the three requirements, a process, as described further below, can unambiguously select the first situation.

A second process 600, illustrated in FIG. 6 and described below, applies such priority ordering and a unique method of assigning node and edge costs to find routing paths with improved resistance to faults affecting groups of links subject to common risks. Process 600 begins by defining a network graph G equal to (N, E, R) representing a physical network to find a primary routing path and a backup routing path between node pair (A, Z), initial step 604. As above, these two paths are preferably disjoint with respect to shared risk of link failures. The process continues by using SRLG sizes as a cost of each edge, that is $C_e=|R_i|$ where $|R_i|$ is the largest risk group edge e is a member of, where e ϵ E, step 608. It is realized that a plurality of edges may be assigned SRLG costs due to practical considerations with zero or estimated SRLG costs assigned as appropriate. Next, K lowest cost paths $p_1$, $p_2, \ldots, p_K$ are computed using costs $C_e$, step 612. Note that open shortest path first (OSPF) is a standard process that can be used to determine the primary routing path and backup routing path as lowest cost paths. This process determines a path based on a metric, such as assigned costs, and thus computes lowest cost paths even though it is called open shortest path first. Then, i is initialized to 1 in step 616 and the current lowest cost path is set to $p_i$, step 620. Continuing with step 624, the residual graph $G_i$ of G is computed by removing from G edges on $p_i$ in the direction from A to Z. In the next step 628, remove from the residual graph $G_i$ the edges, in both directions, that belong to any risk groups that edges in $p_i$ are members of, excluding reversed links on path $p_i$, creating a reduced edge residual graph $G_i'$. Next, assign a fixed cost F equal to (N*max_admin)+1 to each node in $p_i$ dependent upon selective paths associated with each node, where N is the number of nodes and max_admin is the largest administrative cost, step 632 as described in further detail below. This fixed cost is not charged if a node on $p_i$ is entered from a directed link and exited from another directed link both of which belong to the set of remaining (reversed) links on $p_i$. By placing large costs on nodes on the primary path $p_i$, paths that are maximally node disjoint can be found.

Due to the detangling of the primary and backup paths computed via the residual graph, nodes traversed in opposite directions will not appear in the final detangled paths. Thus, such nodes, though they may be initially common between primary and backup paths, will not exist on the final detangled paths. These nodes therefore need not incur fixed costs.

Figure 7A:
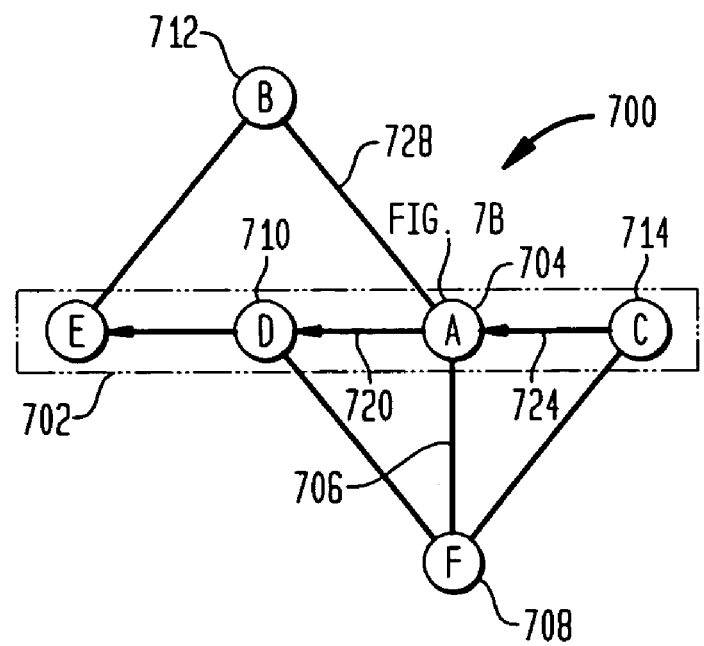
FIG. 7A illustrates a residual graph similar to the graph of FIG. 2C with an additional link.
Figure 7B:
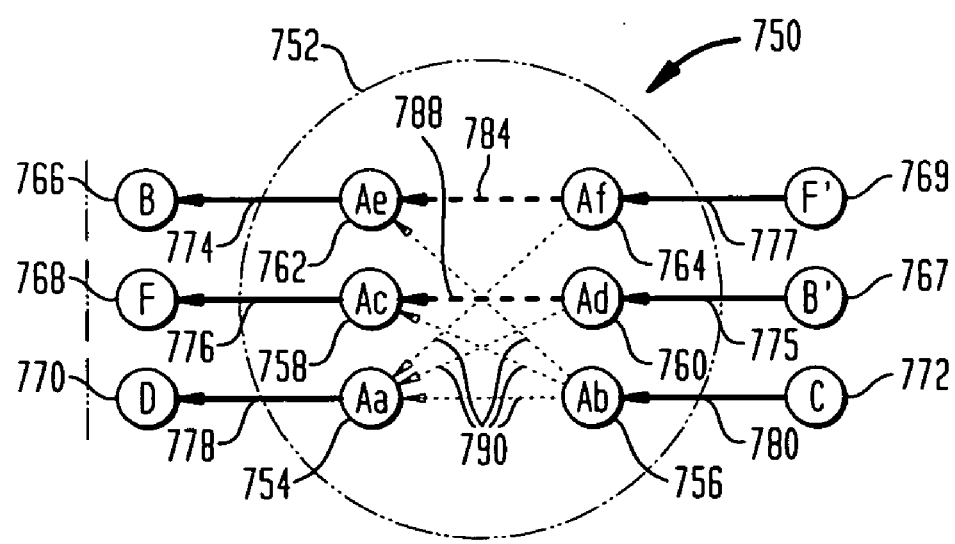
FIG. 7B illustrates an advantageously constructed node graph for a node on the primary lowest cost path used to assign node costs appropriately dependent upon how a node is traversed in specific directions, in accordance with the present invention.

Among its several aspects, the present invention provides an advantageous approach for assigning node costs only if a node is traversed in specific directions. Using residual graph 700 of FIG. 7A, an exemplary node construct 750 is shown in FIG. 7B which illustrates an advantageously constructed node graph for a node on the primary lowest cost path used to assign node costs appropriately which is dependent upon how a node is traversed in specific directions. The nodes in both the residual graph 700 and node construct 750 use a unique letter symbol to represent each node with a path between nodes indicated by use of the → symbol. Residual graph 700 of FIG. 7A shows a reversed primary flow 702, C→A→D→E, after removal of a lowest cost primary flow, E→D→A→C. Node A 704 lies on the primary lowest cost flow computed in the first phase of processing, such as followed in the processing of graph 200 of FIG. 2A producing residual graph 250 including a reversed primary flow 254. The residual graph 700 has an additional bidirectional path 706 connecting node A 704 and node F 708.

In considering node cost assignment, node A 704 should incur no cost if traversed on a flow that includes an edge of the reversed primary flow, such as paths C→A→D, C→A→B, and B→A→D. However, paths F→A→B and B→A→F should incur fixed costs, as these flows will not result in detangling of node A 704 once combined with primary flow E→D→A→C. To obtain the desired end result, each node on the primary path, such as path 244 of FIG. 2B, is replaced by 2a internal nodes, where a is the number of arcs into the node based on the residual graph. An undirected arc is equivalent to two arcs, one in each direction.

Thus, node A 704 with three arcs into it, C→A, B→A, and F→A, is replaced by a replacement node construct 752 made up of six internal nodes, Aa 754, Ab 756, Ac 758, Ad 760, Ae 762, and Af 764, as shown in FIG. 7B. Node F 708, node D 710, node B 712, and node C 714 interface with node A 704 with either unidirectional edges, such as A→D edge 720 and C→A edge 724, or bidirectional edges, such as {A→B and B→A} edge 728 and {A→F and F→A} edge 706. The bidirectional edges are split into separate paths as shown in FIG. 7B such that node B 712 corresponds to the two nodes, node B 766 and node B' 767, and node F 708 corresponds to two nodes, node F 768 and node F' 769. Node D 710 corresponds to node D 770 and node C 714 corresponds to node C 772. The bidirectional edge 728 corresponds to directed edge, Ae→B, 774 and directed edge, B'→Ad 775. The bidirectional edge 706 corresponds to directed edge, Ac→F, 776 and directed edge, F'→Af, 777. Directed edge 720 corresponds to directed edge, Aa→D, 778 and directed edge 724 corresponds to directed edge, C→Ab, 780.

Each flow, such as C→A→B, in FIG. 7A is now identifiable with a unique flow on the new replacement node construct 752, such as C→Ab→Ae→B. The replacement node construct 752 shown in FIG. 7B consists of six internal nodes and new edges connecting these internal nodes, where each edge represents a valid connection path through node A 704. Since there are seven ways to traverse node A 704, C→A→D, C→A→B, C→A→F, B→A→D, B→A→F, F→A→D, and F→A→B, there are seven edges shown in dotted lines in FIG. 7B. Note that paths, such as path B'→Ad→Ae→B, have been excluded since, in this example, it makes little sense to fold on a link for cost routing purposes. A node cost is translated to replacement node internal edge costs. The cost on these edges is determined in step 632 of FIG. 6. For each node on $p_i$, for example node1, D, A, and C of FIG. 7A, construct a replacement path identifiable node made up of 2a internal nodes, for example internal nodes Aa, Ab, Ac, Ad, Ae, and Af of FIG. 7B, interconnected by identifiable paths, such as paths 784, 788, and 790, and assign a cost F, equal to (N*max_admin)+1, to each identifiable path associated with incoming and outgoing paths not used on the reversed primary path $p_i$, such as Af→Ae path 784 and Ad→Ac path 788, with other identifiable paths being assigned a zero cost, such as paths 790, where a is the number of incoming paths incident to a node, N is the number of nodes, and max_admin is the largest administrative cost.

Clearly, with a higher connectivity, a larger number of nodes and edges have to be added to the original residual graph, such as residual graph 700 FIG. 7A. The new residual graph remains computationally tractable since at most max_degree*num_primary_path_nodes replacement internal nodes are used in modifying an original residual graph. Based on a residual graph, the max_degree variable is the maximum a, considering all the primary path nodes, where a is the number of incoming paths incident on a node. In addition, at most max_degree*max_degree new edges are added to the residual graph. Thus, the lowest cost path computations remain polynomial. In real networks, since the max_degree is around four to five, this construct does not add much to the complexity of finding a solution or to the computational times.

In the next step 634, an administrative cost function H is assigned for each edge e external to the constructed replacement nodes and e ϵ E. It is noted, that process 600 can use arbitrary administrative costs for edge cost function H, where administrative cost is any non-negative assignment of costs to edges of a graph. For example, administrative cost can include a number representing the inverse of a link's bandwidth such that higher bandwidth links are rewarded with lower costs to encourage their use. Another example of administrative costs can include a number representing latency delay in order to discourage the use of high latency links.

The lowest cost path process that was run previously in step 612 is now run on the reduced edge residual graph $G_i'$ to find a lowest cost path $q_i$ from A to Z using the assigned node and edge costs, step 636. If a lowest cost path $q_i$ was found, step 640, the process detangles paths $p_i$ and $q_i$ and saves $p_i$ and $q_i$ or their detangled variants as the detangled paths $p_i'$ and $q_i'$ in a results file, step 644. The two lowest cost paths $p_i'$ and $q_i'$ that have been found are SRLG disjoint, have low administrative cost and are maximally node disjoint. Process 600 then proceeds to step 648 where it is determined whether all K lowest cost paths have been evaluated. If all paths have not been evaluated, then the process proceeds to increment i by one, step 660, and proceeds back to step 620 to repeat the steps 620 to 648 to continue to try to find a disjoint pair of paths. Back at step 640, if a lowest cost path $q_i$ was not found for this graph $G_i'$, then the process, for example, saves the fact that no $q_i$ was found in a results file, step 656, and proceeds to step 648. If all paths have been evaluated, then the process proceeds to step 652 where the $p_i'$ and $q_i'$ with lowest administrative costs are selected from the saved results file or it is noted that no paths were found and process 600 stops.

Table 1 below illustrates the performance of process 600 on two sets of realistic networks. Network 1 consists of 58 nodes and 101 links while network 2 consists of 24 nodes and 39 links. SRLG-disjoint paths were computed for all node pairs in each network and the average run time, the variance, and the degree of node-disjointness possible were measured. These simulation calculations were conducted on a Sun4u Sparc Ultra-Enterprise machine.

nodes to the backup routing path. By having SRLG disjoint paths that are as node disjoint as possible and have minimum administrative costs, the switch to the backup routing paths will have a high degree of success.

Figure 8:
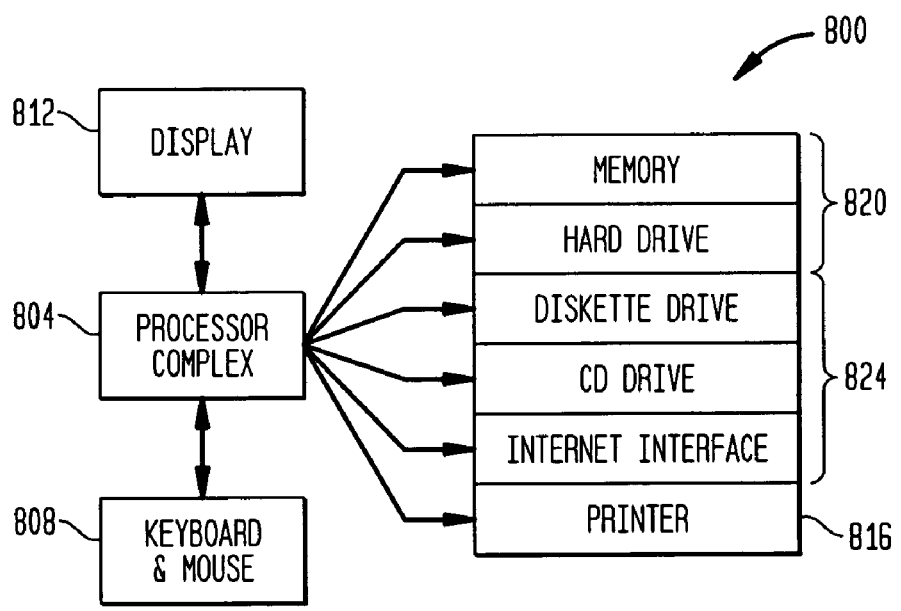
FIG. 8 shows a computer system for implementing a process in accordance with the present invention.

Process 600 has been developed using C/C++ code and can be run on standard personal computers such as computer system 800 shown in FIG. 8. A computer system 800, or the like, may suitably comprise a processor complex 804, a user interface or interfaces such as a keyboard and mouse 808, a display 812, and output, such as printer 816. Memory and hard drive 820 for storing and running programs such as C/C++ or other suitable code for implementing process 600, and media interfaces 824 consisting of a diskette drive, cd drive, internet interface and the like, for transferring data and programs, such as process 600 with network graphs stored and manipulated as abstract data types, are also part of the computer system 800.

Figure 5:
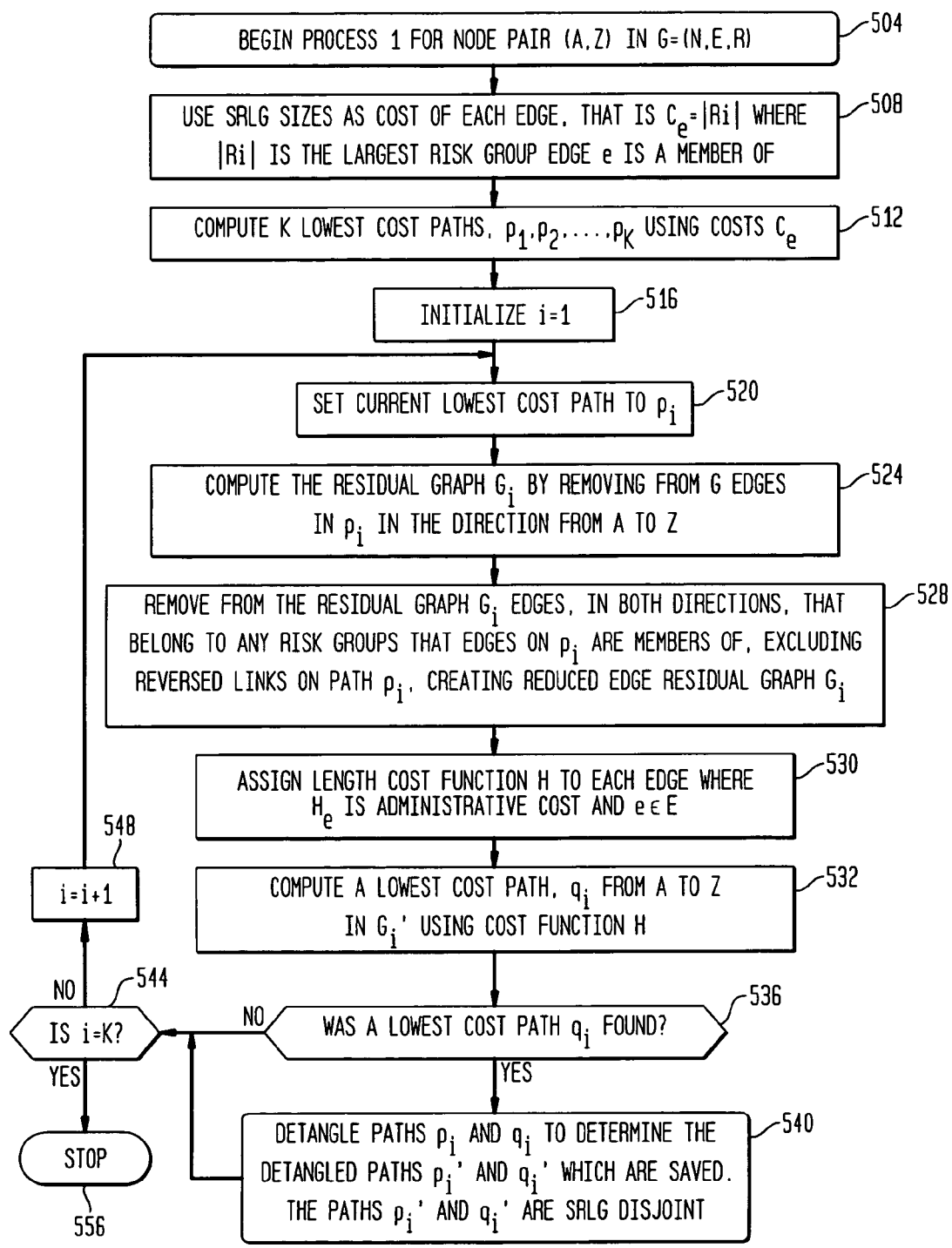
FIG. 5 illustrates a presently preferred second program flow chart of an improved SRLG disjoint path routing process in accordance with the present invention.

Using a computer system, such as computer system 800, process 600 of FIG. 6 has shown a faster rate of convergence to a solution than process 500 of FIG. 5. Realistic network convergence to solutions having run times on the order of 100 msecs have been achieved. Consequently, process 600 can be used in physical networks to statically determine routing paths or to dynamically route paths based upon real time network characteristics.

While the present invention has been disclosed in a presently preferred context, it will be recognized that the present teachings may be adapted to a variety of contexts consistent with this disclosure and the claims that follow. By way of example, while a presently preferred embodiment of the present invention is to find a strict SRLG-disjoint pair of routing paths, it is realized that practical or physical considerations may intervene. For example, there may be physical networks where the process of forming the reduced edge residual graph, such as described in step 528 and in step 628, is adjusted such that it may not remove all edges, in both directions, that belong to any risk groups that edges on $p_i$ are

TABLE 1

|  | Run Time (msec) Min/Mean/Max – standard deviation | Number of Node Overlaps Min/Mean/Max | Value of K in K-lowest cost paths giving best solution, Min/Mean/Max |
|---|---|---|---|
| Network 1 58 nodes, 101 links | 150/337/640 – 76 | 0/0/0 – 0 | 1/1.94/32 – 3.11 |
| Network 2 24 nodes, 39 links | 10/155/220 – 33 | 0/0.37/2 – 0.72 | 1/1.33/7 – 0.85 |

It is observed that in network 1 node-disjoint paths were allowed between all node pairs and process 600 obtained all such primary and backup paths while network 2 had some node pairs for which node-disjoint paths were not possible. In all cases examined, the paths were also of minimal total administrative costs meeting one of the goals of the routing process for physical networks.

In use on physical networks, the two paths generated, for example, by process 600 for a physical network are used to configure the physical network node switches to support one of the paths as a primary routing path and support the other diversely routed path as a backup path. A transmission is thereby set up to use the primary routing path unless a failure of the primary routing path is detected. Upon detection of a failure in the primary routing path, the physical network nodes switch to the backup routing path. For example, set up messages may be used to reconfigure the physical network members of. As an alternative for the edges not removed, a high administrative cost may be applied. In another example, while the present invention has been disclosed primarily in the context of optical networks, it will be recognized that the invention can be applied to routing processes for other network implementations, such as wired networks, and further can be used in planning stages of network deployment to improve a network's resistance to faults in the links between nodes in the network.

We claim:

1. A method of determining a first primary path and a first backup path for routing information in a physical network of connection nodes connected by links, the method comprising:

defining a graph G to represent the physical network with nodes of the graph G representing connection nodes of the physical network and edges of the graph G representing links of the physical network;

assigning shared risk of link failure costs to a plurality of the edges of the graph G;

identifying a first path from a first node of the network to a second node of the network based on the graph G with the assigned shared risk of link failure costs; and identifying a second path from the first node of the network to the second node of the network based on a reduced edge residual graph, wherein a reduced edge residual graph is formed by removal of edges from the graph G that share a risk of failure with an edge of the first path, wherein edges on the first path from the second node to the first node are excluded from being removed.

2. The method of claim 1, wherein the first path is a lowest cost path for the graph G and the second path is a lowest cost path for the reduced edge residual graph, the method further comprising:

removing from the graph G each edge of the first path to define a first residual graph;

removing from the first residual graph edges in both directions that share a risk of failure with an edge of the first path excluding reversed links on the first path to define a second residual graph; and assigning node costs and edge costs to the second residual graph to define a reduced edge residual graph with added costs.

3. The method of claim 1 further comprising detangling the first path and the second path comprises:

merging the first path with the second path to form a merged graph; and removing shared redundant edges from the merged graph to determine first primary path and a first backup path, wherein the first primary path is disjoint from the first backup path with respect to shared risk of link failures.

4. The method of claim 1 wherein the shared risk of link failure costs are identified by:

identifying a plurality of sets of edges, where each set has edges corresponding to links that share a common failure risk and where an edge may be a member of more than one set, the edges of each set having a shared risk link group (SRLG) attribute;

calculating the sum of the SRLG attributes in each set of edges as an SRLG size metric; and assigning to each edge in the graph G a largest SRLG size that is associated with the edge.

5. The method of claim 1 further comprising:

constructing for each node on the first path a replacement node made up of multiple internal nodes that are interconnected by identifiable paths, wherein each identifiable path represents a valid connection path through the node;

assigning a node cost to each identifiable path associated with incoming and outgoing paths not used on a reversal of the first path; and assigning to one or more other identifiable paths a zero cost.

6. A method for constructing replacement nodes in a network graph comprising:

defining a network graph G to represent a physical network with nodes of the network graph G representing connection nodes of the physical network and edges of the network graph G representing links of the physical network;

identifying a network path from a starting node to an ending node in the network graph G; selecting nodes on the network path to be replacement nodes;

constructing $2*b$ internal nodes for each replacement node, where the b is the number of incoming paths incident to the replacement node located in a reduced edge residual graph from which, at least one edge that shares a risk of failure with an edge of the network path, has been removed; and interconnecting the $2*b$ internal nodes in each replacement node by identifiable paths, each identifiable path representing a valid path of the reduced edge residual graph.

7. The method of claim 6 further comprising:

removing the network path from the network graph G to create a residual graph; and removing from the residual graph each edge that shares a risk of failure with an edge of the network path to define the reduced edge residual graph.

8. The method of claim 6 further comprising:

in each of the replacement nodes, assigning a node cost to the identifiable paths, associated with incoming and outgoing paths not used on a reversal of the network path; and in each of the replacement nodes, assigning a zero cost to one or more other identifiable paths.

9. The method of claim 8 wherein the node cost is equal to $(N*max\_admin)+1$ where N is the number of nodes of the physical network and $max\_admin$ is the largest administrative cost associated with the physical network.

10. A computer-readable medium having instructions encoded on the medium which cause a computer system to perform a routing method for determining a first primary routing path and a first backup routing path in a physical network of connection nodes connected by links, by performing the steps of:

defining a graph G to represent the physical network with nodes of the graph G representing connection nodes of the physical network and edges of the graph G representing links of the physical network;

assigning shared risk of link failure costs to a plurality of the edges of the graph G;

identifying a first routing path from a first node of the network to a second node of the network based on the graph G with the assigned shared risk of link failure costs; and identifying a second routing path from the first node of the network to the second node of the network based on a reduced edge residual graph, wherein the reduced edge residual graph is formed by removal of edges from the graph G that share a risk of failure with an edge of the first routing path, wherein edges on the first routing path from the second node to the first node are excluded from being removed.

11. The computer-readable medium of claim 10 wherein the first routing path is a lowest cost path for the graph G and the second routing path is a lowest cost path for the reduced edge residual graph, the computer-readable medium further comprising:

removing from the graph G each edge of the first routing path to define a first residual graph;

removing from the first residual graph edges in both directions that share a risk of failure with an edge of the first routing path excluding reversed links on the first path to define a second residual graph; and assigning node costs and edge costs to the second residual graph to define a reduced edge residual graph with added costs.

12. The computer-readable medium of claim 11 wherein the edge costs are administrative costs associated with each edge.

13. The computer-readable medium of claim 10 further comprising detangling the first routing path and the second routing path comprises:
  merging the first routing path with the second routing path to form a merged graph; and
  removing shared redundant edges from the merged graph to determine first primary routing path and a first backup routing path, wherein the first primary routing path is disjoint from the first backup routing path with respect to shared risk of link failures.

14. The computer-readable medium of claim 13 further comprising:
  configuring the physical network to use the first primary routing path as the path selected for communicating information in the physical network; and
  switching from the first primary routing path to the first backup routing path upon detection of a failure on the second primary routing path.

15. The computer-readable medium of claim 10 wherein the shared risk of link failure costs are identified by:
  identifying a plurality of sets of edges, where each set has edges corresponding to links that share a common failure risk and where an edge may be a member of more than one set, the edges of each set having a shared risk link group (SRLG) attribute;
  calculating the sum of the SRLG attributes in each set of edges as an SRLG size metric; and
  assigning to each edge in the graph G a largest SRLG size that is associated with the edge.

16. The computer-readable medium of claim 10 further comprising:
  constructing for each node on the first routing path a replacement node made up of multiple internal nodes interconnected by identifiable paths, wherein each identifiable path represents a valid connection path through the node;
  selecting a node cost that is a largest administrative cost associated with paths in the physical network;
  assigning the node cost to each identifiable path associated with incoming and outgoing paths not used on a reversal of the first routing path; and
  assigning to one or more other identifiable paths a zero cost.

17. A method for representing by a graph a physical network of connection nodes connected by links, the physical network being graphically represented as a plurality of nodes connected by edges, the method comprising:
  identifying a first path between first and second nodes in the graph based on shared risk link group (SRLG) function costs associated with edges in the graph; and
  determining a residual graph by removing edges from the graph representing the physical network, each removed edge sharing a risk of failure in common with an edge of the first path, wherein edges on the first path from the second node to the first node are excluded from being removed.

18. The method of claim 17 further comprising:
  selecting nodes to be graphically represented in an expanded form; and
  constructing for each selected node an expanded node made up of multiple internal nodes interconnected by identifiable paths associated with valid paths of the residual graph.

19. The method of claim 18 further comprising:
  assigning a node cost to identifiable paths not used on a reversal of the first path;
  assigning a zero node cost to one or more other identifiable paths;
  identifying a second path in the residual graph between the first and second nodes in the physical network based on the assigned node costs.

20. The method of claim 17 wherein the SRLG function costs are determined by:
  assigning SRLG attributes to edges sharing a common risk of failure;
  calculating for each edge a function of the SRLG attributes associated with each risk of failure; and
  assigning to each edge in the graph a largest SRLG function cost that is associated with the edge.

* * * * *